United States Patent [19]

Stenger-Smith

[11] Patent Number: 5,162,470

[45] Date of Patent: Nov. 10, 1992

[54] POLYMERS WITH ELECTRICAL AND NONLINEAR OPTICAL PROPERTIES

[76] Inventor: John Stenger-Smith, 1133 Meadowview La., Ridgecrest, Calif. 93555

[21] Appl. No.: 682,169

[22] Filed: Apr. 9, 1991

[51] Int. Cl.$^5$ .............................................. C08G 61/02
[52] U.S. Cl. ................................... 526/256; 528/380; 528/379; 526/243; 526/279; 526/287; 526/291; 576/298; 576/311; 576/313
[58] Field of Search ................ 526/256, 242; 528/373, 528/379, 380, 205, 210; 525/327.2, 328.5, 371, 535

[56] References Cited

U.S. PATENT DOCUMENTS 4,818,616  4/1989  Milverton et al. ............... 428/411.1
4,950,737  8/1990  Heitz et al. ......................... 528/392

FOREIGN PATENT DOCUMENTS 63-273631  11/1988  Japan .
64-79217    3/1989  Japan .
1-200234    8/1989  Japan .
2-32121     2/1990  Japan .

OTHER PUBLICATIONS

Polymer Bulletin, Springer—Verlag, 1986, #15, p. 181–184, "Synthesis and Electrical Conductivity of AsF$_5$-Doped Poly(Arylene Vinylenes)", S. Antoun, D. R. Gagnan, F. E. Karaz, & R. W. Lenz.

Journal of Polymer Science: Part C Polymer Letters, Vol. 24, pp. 503–509, 1986, "Preparation and Electrical Conductivity of Poly (1,4-Naphthalene)", S. Antoun, D. R. Gagnon, F. E. Karasz, & R. W. Lenz.

Primary Examiner—Joseph L. Schofer
Assistant Examiner—M. Nagumo
Attorney, Agent, or Firm—Stuart H. Nissim; Melvin J. Sliwka; John J. Forrest, Jr.

[57] ABSTRACT

Novel conjugated stilbenylene polymers are disclosed having non-linear optical properties, and which can be converted to electrically conductive polymers. Such polymers are produced by reacting a novel bis-cycloalkylene sulfonium salt of 2,5-dimethyl stilbene, e.g. 2,5-(4'-methoxy)-stilbene dimethylene bis-(tetramethylene sulfonium bromide), with alkali metal hydroxide to form a cycloalkylene sulfonium salt precursor polymer, and then heating the precursor polymer under conditions to produce the stilbenylene vinylene polymer, e.g. poly(2,5-(4'-methoxy)stilbenylene vinylene).

14 Claims, No Drawings

POLYMERS WITH ELECTRICAL AND NONLINEAR OPTICAL PROPERTIES

BACKGROUND OF THE INVENTION

This invention relates to the production of polymers with electrical and/or third order non-linear optical (NLO) properties, and is particularly concerned with the preparation of novel conjugated stilbenylene vinylene polymers having the above characteristics.

Polymers with electrical properties can be used for electromagnetic shielding, electronic counter measures, electrical device fabrication, and optical switching. Polymers with third order NLO properties can be used in smart skins, eye protection and optical switching.

In the article "Synthesis and Electrical Conductivity of $AsF_5$-Doped Poly(Arylene Vinylenes)" by S. Antoun, et al., Polymer Bulletin, 15,181-184 (1986), a series of polymers containing 2,5-disubstituted phenylene vinylene units, and the polymer containing 1,4-naphthalene vinylene units, were prepared by polymerization of their bis(sulfonium salts) through a base elimination reaction in solution. Films of these polymers were cast from aqueous solution and chemically treated (doped) with $AsF_5$ vapor. The electrical conductivity of the doped films varied greatly with changes in polymer structure. The preparation of poly(1,4-naphthalenevinylene) is also disclosed in the article "Preparation and Electrical Conductivity of Poly(1,4 Naphthalene Vinylene)" by S. Antoun, et al., Journal of Polymer Science: Part C: Polymer Letters, Vol 24, 503-509, (1986).

One object of the present invention is the provision of novel polymers having non-linear optical properties and/or electrical conductivity properties, and precursors of such polymers.

Another object is to provide certain stilbenylene vinylene polymers having the above properties.

A still further object is the provision of procedure for producing the above polymers and compounds.

SUMMARY OF THE INVENTION

The above objects are achieved according to the invention by the provision of a class of polymers based on 2,5-stilbenylene vinylene as the parent repeating unit and characterized by the following general formula:

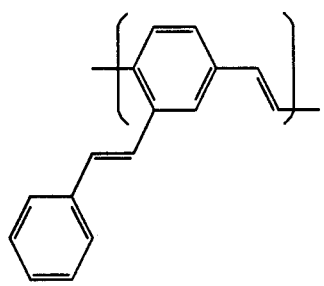

(I)

A preferred variety class of the polymers of this invention is poly(2,5-(4'-methoxy) stilbenylene vinylene) (PMSV), the repeating unit characterizing the polymer having the structure shown below.

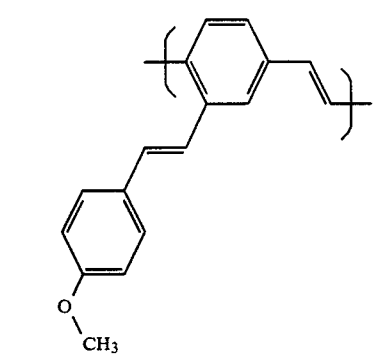

(IA)

Films of the above class of polymers can be formed by casting from a solvent solution, with the resulting films exhibiting strong, stable nonlinear optical properties. Such films become highly electrically conductive after a suitable doping treatment.

DETAILED DESCRIPTION OF THE INVENTION AND PREFERRED EMBODIMENTS

The conjugated stilbenylene vinylene polymers of the invention are prepared by polymerizing a bis-cycloalkylene sulfonium salt of 2,5-dimethyl stilbene having the following formula:

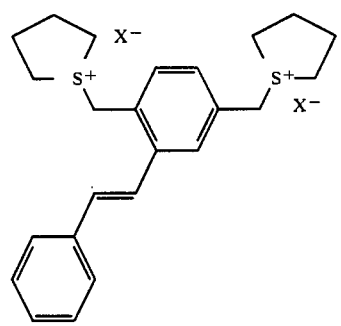

(II)

where X is halogen,
in the presence of alkali metal hydroxide at reduced temperature to form a cycloalkylene sulfonium salt precursor polymer. This is followed by evaporation of solvent and then heating of such precursor polymer under conditions to form the stilbenylene vinylene polymer I above. Thus, poly(2,5-(4'-methoxy) stilbenylene vinylene) can be prepared by the polymerization of the bis-sulfonium salt 2,5-(4'-methoxy)-stilbene dimethylene bis-(tetramethylene sulfonium bromide) in solution in water/acetone, or other suitable solvent, in the presence of sodium hydroxide, at low temperature, e.g. 0° C., to form a cycloalkylene sulfonium salt precursor polymer, followed by heating of the precursor polymer at a temperature between about 150° C. and about 300° C., in vacuo, according to the following reaction scheme:

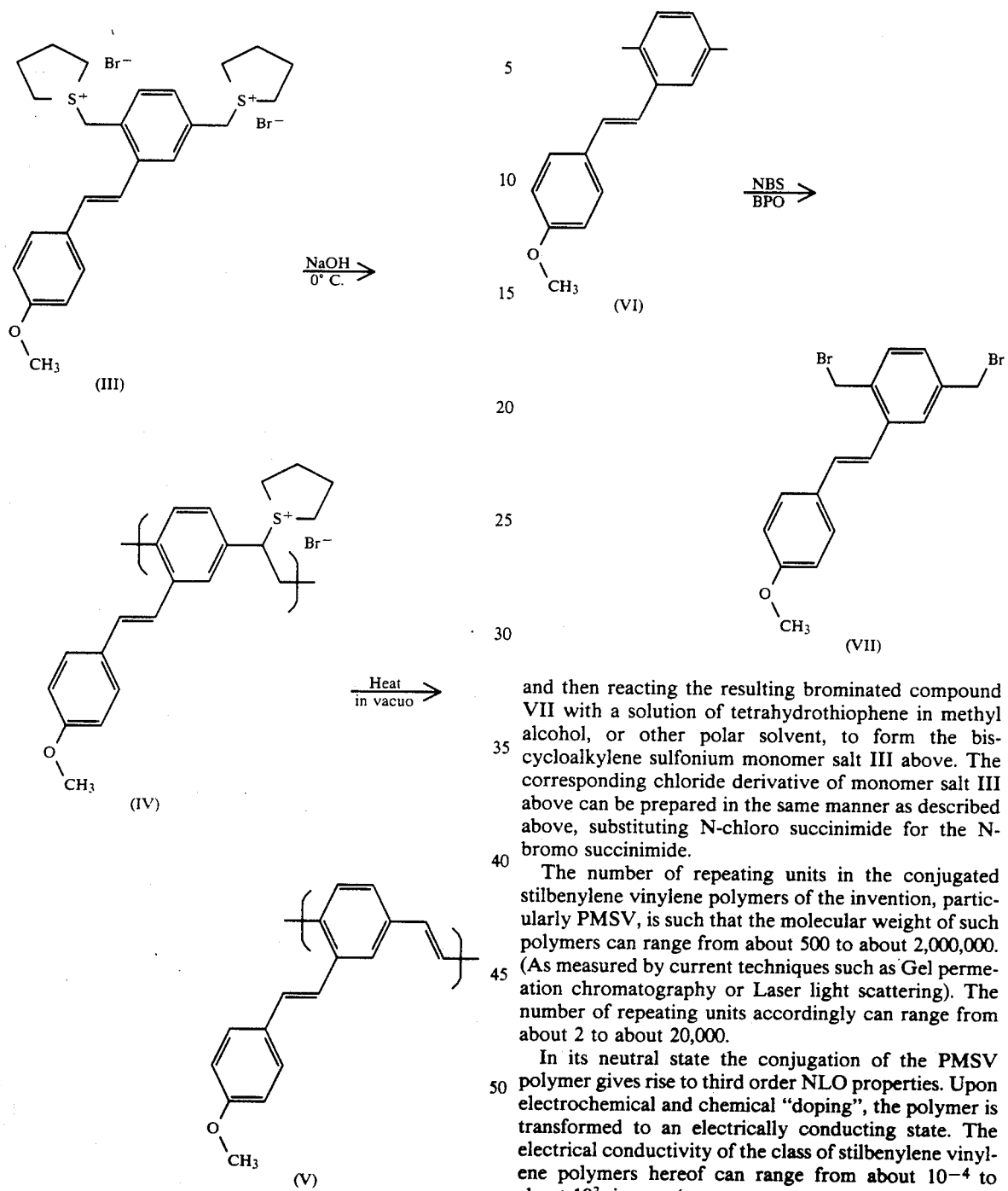

The bis-cycloalkylene sulfonium monomer salts noted above are novel compounds which, e.g. in the case of the methoxy derivative compound III noted above, can be prepared by heating 2,5-dimethyl-4 α-methoxy stilbene with N-bromo succinimide (NBS) and benzoyl peroxide (BPO) under benzene reflux, as shown by the following reaction scheme:

and then reacting the resulting brominated compound VII with a solution of tetrahydrothiophene in methyl alcohol, or other polar solvent, to form the bis-cycloalkylene sulfonium monomer salt III above. The corresponding chloride derivative of monomer salt III above can be prepared in the same manner as described above, substituting N-chloro succinimide for the N-bromo succinimide.

The number of repeating units in the conjugated stilbenylene vinylene polymers of the invention, particularly PMSV, is such that the molecular weight of such polymers can range from about 500 to about 2,000,000. (As measured by current techniques such as Gel permeation chromatography or Laser light scattering). The number of repeating units accordingly can range from about 2 to about 20,000.

In its neutral state the conjugation of the PMSV polymer gives rise to third order NLO properties. Upon electrochemical and chemical "doping", the polymer is transformed to an electrically conducting state. The electrical conductivity of the class of stilbenylene vinylene polymers hereof can range from about $10^{-4}$ to about $10^3$ siemens/cm.

It is noted that on or more of various substituents can be added on the phenyl rings of the 2,5-stilbenylene vinylene moiety of compound I noted above; these substituents can be electron donating and/or electron accepting. Specific examples of such substituents include: alkyl of from 1 to about 22 carbon atoms, e.g. methyl; alkoxy containing from 1 to about 22 carbon atoms, e.g. methoxy; nitro; halogen; mono- and di- alkylamine containing from 1 to about 22 carbon atoms; amino; sulphonate groups; silyl; perfluoro alkyl, e.g. ($CF_3$); and cyano esters. Thus, examples of specific polymers of the invention in addition to PMSV include poly(2,5-(4,4'dimethoxy) stilbenylene vinylene), poly (2,5-(4-methoxy,4'-nitro) stilbenylene vinylene), poly(2,5-(4-methoxy4'cyano)stilbenylene vinylene), and poly(2,5-(3,4,3',4'-tetrachloro) stilbenylene vinylene), etc.

Doping of the polymers of the invention for transformation thereof to a conducting state can be carried out in various ways. According to one mode of procedure this can be done electrochemically by cyclic voltammetry. This method is used to measure the oxidation or reduction potential (versus a reference electrode) of the polymer or compound involved during electrochemical oxidation. Films of the precursor polymer such as polymer IV are cast upon the positive working electrode using, for example, about 0.01 ml of precursor polymer solution in DMF/H$_2$O (90/10), and heating the film under vacuum at the appropriate temperature to convert the precursor polymer to the final polymer, e.g. polymer V. The cyclic voltammograms were performed against a Ag/AgCl reference electrode under inert conditions using dried dichloromethane or acetonitrile as the solvent with t-butylammonium perchlorate as the supporting electrolyte. The scan speed was varied between and 100 mVolts per second. Supporting electrolytes were t-butylammonium salts of SbF$_6$, PF$_6$, BF$_4$, AsF$_6$, and ClO$_4$. Conductivity can also be conferred by chemical treatment of the polymers such as polymer V with oxidant dopants such as AsF$_5$, iodine, H$_2$SO$_4$, SO$_3$, HCl$_4$, etc.

The following are examples of practice of the invention.

EXAMPLE 1

Preparation of 2,5-(4'methoxy)stilbene (VI)

To a 500 ml round bottom flask were added 58.06 g (0.139 mol) of 2,5-dimethylbenzyltriphenylphosphonium chloride and 400 ml of 0.4M lithium ethoxide. The pale yellow solution was allowed to stir for about 5 minutes after which 18.98 g (0.139 mol) of 4-methoxybenzaldehyde were added and the solution was stirred for 24 hours at room temperature. To this solution, 25 ml of distilled water were added, the solution was allowed to stir for 1 hour and then the flask and contents were cooled to $-20°$ C. The resulting mixture was filtered cold, the filtrate (14 g) was then dried for 24 hours in vacuo.

The crude product VI was then digested for 24 hours in boiling para xylene with a trace of iodine. The digesting solution was then rotovapped and dried in vacuo and the remaining solid recrystallized from boiling ethanol to form white crystals.

Yield: 12.14 g (36%), MP:68° C.

Preparation of 2,5-bis-(bromomethyl)(4'methoxy)stilbene (VII)

First, 12.14 g of compound VI was dissolved in 300 ml benzene with 0.04 g of Benzoyl peroxide. Then the solution was refluxed, under N$_2$ at 95° C., for two (2) hours, cooled for 20 minutes then 9.2 g of N-Bromosuccinimide and 0.05 g Benzoyl peroxide were added. The solution was refluxed, under N$_2$ at 95° C., for two (2) more hours and cooled for 20 minutes. An additional 9.2 g N-Bromosuccinimide and 0.05 g Benzoyl peroxide were added. The solution refluxed, under N$_2$ at 95° C., for 30 hours, cooled for 20 minutes. The last 9.2 g of N-Bromosuccinimide and 0.05 g Benzoyl peroxide were added. The solution was refluxed, under N$_2$ at 95° C., for two (2) more hours, cooled for 20 minutes, extracted three times with H$_2$O, extracted three times with saturated NaHCO$_3$ (75 ml), the organic phase was dried with MgSO$_4$, and rotovapped to dryness. Material was then recrystallized from Ethanol.

Yield 8.1 grams (40%).

Preparation of the bis-cycloalkylene monomer salt (III)

The monomer, 2,5-(4'methoxy)stilbene dimethylene bis-(tetramethylenesulfonium bromide) (III), was prepared from compound VII by the following procedure. Into a 200-ml flask equipped with a magnetic stirrer were placed 4.46 g (0.011 mol) of 2,5-bis-(bromomethyl)(4'-methoxy)stilbene (VII), 4.0 g (0.045 mol) of tetrahydrothiophene, and 40 ml of methanol. The mixture was stirred at room temperature. After approximately ½ hour the mixture turned into a solution, and an hour or so later a white precipitate was formed. The mixture was stirred overnight at room temperature, cooled to $-20°$ C. and filtered, to recover the precipitate, the sulfonium salt monomer (III).

Preparation of precursor polymer IV

Both solutions used in the following polymerization step were degassed with N$_2$ at room temperature for two (2) hours. To 26 ml of a 0.19 M Water/Acetone (60/40) solution of the sulfonium salt monomer (III) (4.8 mmol), was added dropwise under nitrogen 13 ml of a 0.36 M Water/Acetone (60/40) solution of NaOH (4.8 mmol). After addition of all the base solution, a resinous material in the form of a cycloalkylene precursor polymer (IV), precipitated out of solution and stopped the stir bar from stirring. The material was filtered out, was several times washed with pure H$_2$O and then acetone, then dissolved in 22 ml of 90/10 DMF/H$_2$O.

EXAMPLE 2

Film Casting

Two (2) ml of the precursor polymer (IV) solution of Example 1 were diluted further with 10 ml of DMF/H$_2$O (90/10). A few drops of this solution were placed on a polyethylene substrate and allowed to evaporate. The resulting film could be removed from the substrate and an Infrared Spectrum of the fresh film was taken. The fresh film was then heated in vacuo at 210° C. for six (6) hours for conversion of the precursor polymer (IV) to product polymer (V). This procedure was repeated for several different temperatures (e.g. 170°, 250°, and 300° C.) until a preferred conversion temperature of 270° C. was reached. At a temperature, of 210° C. for 24 hours in vacuo, the precursor polymer (IV) was fully converted to PMSV (V).

EXAMPLE 3

A few drops of the undiluted solution of the precursor polymer (IV) of Example 1 were cast on an electrode and treated at a conversion temperature of 270° C. The material was then studied using cyclic voltammetry at sweep speeds of 6.25, 12.5, 25, 50, and 100 milliVolts per second from 0 to 0.5 volts versus the Ag/Ag$^+$ reference electrode, for converting polymer V to its electrically conductive form. Electrochemical activity indicative of a transition from an insulating (neutral) form to a conducting (oxidized) form was observed, evidenced by an oxidation potential of 0.4 Volts versus the Ag/Ag$^+$ electrode.

EXAMPLE 4

A free standing film made from the undiluted solution was converted to the final polymer (V) by the methods described above (e.g. Example 2) and then treated with iodine vapor in a vacuum atmosphere. Some color change was observed, indicating oxidation of the polymer to its conductive form.

EXAMPLE 5

A film cast of PMSV (V) was found to be optically non-linear. A $X^3$ value of $10^{-11}$ esu was found for PMSV using degenerate four wave mixing.

From the foregoing, it is seen that the invention provides for the preparation of a novel class of stilbenylene vinylene polymers, including certain stilbene monomers employed in preparing such polymers, such polymers having non-linear optical properties and also exhibiting electrical conductivity upon electrochemical or chemical oxidation doping. Various uses of such polymers are noted above.

Since various changes and modifications can be made in the invention without departing from the spirit of the invention, the invention is not to be taken as limited except by the scope of the appended claims.

What is claimed is:

1. Polymers characterized by a repeating unit comprising the formula:

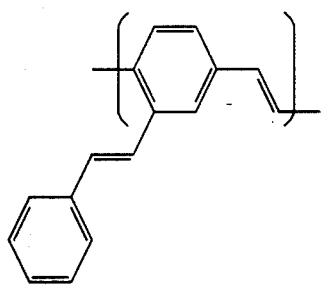

2. Polymers as defined in claim 1, having electrically conductive properties.
3. Polymers as defined in claim 1, said polymers being doped and electrically conducting.
4. Polymers as defined in claim 1, the number of said repeating units being such that said polymers have a molecular weight ranging from about 500 to about 2,000,000.
5. Polymers as defined in claim 1, containing one or more substituents on the phenyl rings.
6. Polymers as defined in claim 5, said substituents selected from the group consisting of: alkyl of from 1 to about 22 carbon atoms; alkoxy containing from 1 to about 22 carbon atoms; nitro; halogen; cyano ester, mono- & di- alkylamine of from 1 to about 22 carbon atoms; amino; sulphonate groups; silyl; and, perfluoro alkyl.
7. Polymers as defined in claim 1, selected from the group consisting of: poly(2,5-(4'methoxy) stilbenylene vinylene); poly(2,5-(4,4'-dimethoxy) stilbenylene vinylene); poly (2,5-(4-methoxy, 4'-nitro) stilbenylene vinylene); poly(2,5-(4-methoxy-4'cyano)stilbenlene vinylene); and, poly(2,5-(3,4,3',4 α-tetrachloro) stilbenylene vinylene).
8. Polymers a defined in claim 7, having a molecular weight ranging from about 500 to about 2,000,000.
9. Polymers as defined in claim 8, said polymers being doped and electrically conducting.

10. Polymers as defined in claim 1, the repeating unit of such polymers having the formula:

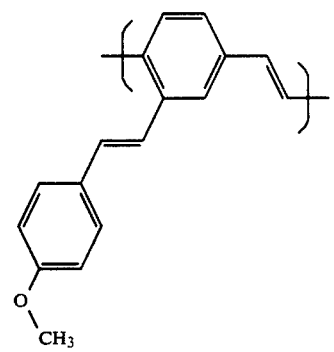

11. Polymers as defined in claim 10, the number of said repeating units being such that said polymers have a molecular weight ranging from about 500 to about 2,000,000.
12. A process for producing stilbenylene vinylene polymers which comprises reacting a bis-cycloalkylene sulfonium salt of 2,5-dimethyl stilbene with alkali metal hydroxide at about 30° C. or below to form a cycloalkylene sulfonium salt precursor polymer, and heating said precursor polymer under conditions to produce a polymer having the repeating unit of the formula:

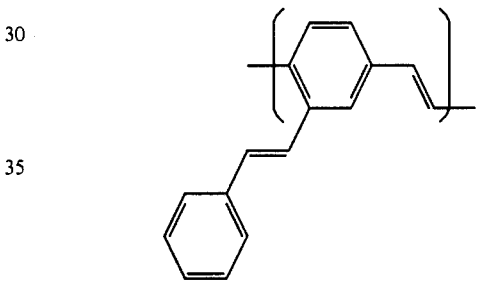

13. The process as defined in claim 12, for producing poly(2,5-(4'methoxy) stilbenylene vinylene) which comprises reacting a bis-sulfonium salt having the formula:

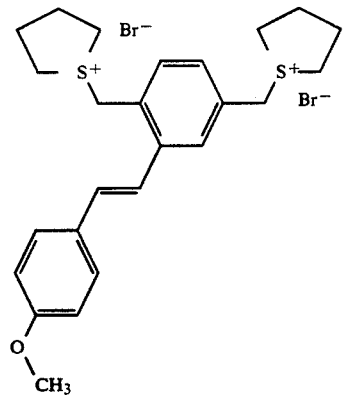

with sodium hydroxide at temperature of about 0° C. to form a cycloalkylene sulfonium salt precursor polymer, and heating said precursor polymer at between about 150° C. and about 300° C., and in vacuo to produce poly(2,5-(4'methoxy) stilbenylene vinylene).

14. The process as defined in claim 13, said heating of said precursor polymer taking place at about 270° C.

* * * * *